United States Patent Office 3,661,924
Patented May 9, 1972

3,661,924
DERIVATIVES OF N-ALKYNYLTRIHALOGEN-IMIDAZOLE AS ACTIVE SUBSTANCES IN AGENTS FOR COMBATING ECTOPARASITES
Henry Martin, Basel, Switzerland, and Georg Pissiotas, Lorrach, Germany, assignors to Ciba Limited, Basel, Switzerland
No Drawing. Filed Oct. 7, 1969, Ser. No. 864,542
Claims priority, application Switzerland, Oct. 17, 1968, 15,559/68
Int. Cl. C07d 49/36
U.S. Cl. 260—309
6 Claims

ABSTRACT OF THE DISCLOSURE

The invention comprises N-alkynyl-2,3,5 trihalogen-imidazoles and their use as active ingredients in preparations for combating ectoparasites.

The invention relates to new compounds derived from N-alkynyltrihalogenimidazole, their manufacture and their use as active substances in agents for combating ectoparasites.

The present invention provides compounds of the general formula

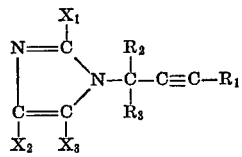

(I)

wherein $X_1$, $X_2$ and $X_3$ each represents a halogen atom, $R_1$ represents a hydrogen or halogen atom or $C_{1-4}$ alkyl group, and $R_2$ and $R_3$ each represents a hydrogen atom or a $C_{1-4}$ alkyl residue.

The $C_{1-4}$ alkyl residues which $R_1$ to $R_3$ may represent can be branched or straight-chain, unsubstituted or substituted. Possible substituents are preferably —OH or halogen. By halogen, F, Cl, Br and I-atoms are preferably to be understood.

The present invention especially provides compounds of formula

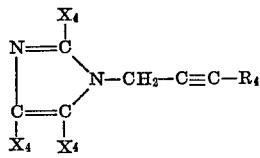

(II)

wherein $R_4$ represents a hydrogen or iodene atom or a $C_{1-4}$ alkyl group and $X_4$ represents Cl or Br.

As examples of compounds of Formula II, the following may be mentioned:

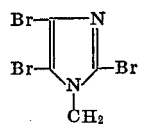

(III)

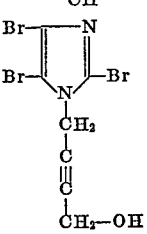

(IV)

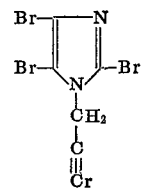

(V)

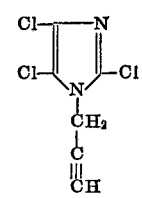

(VI)

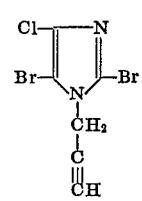

(VII)

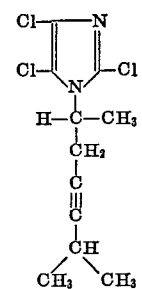

(VIII)

The present invention also provides a process for preparing the imidazole derivatives of Formula I which comprises reacting an imidazole of formula

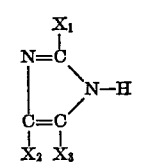

(IX)

with a reactive ester of an alcohol of formula

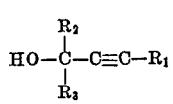

(X)

preferably in the presence of an acid-binding agent. The substituents $R_1$ to $R_3$ and $X_1$ to $X_3$ have the meanings given for Formula I.

The hydrogen halide esters, that is to say, the chlorides, bromides or iodides are advantageously chosen as reactive esters of alcohols of Formula X.

Possible acid-binding agents are, for example, alkali carbonates, alkali bicarbonates or alkali alcoholates.

If in the resulting end product of Formula I, $R_1$ represents a hydrogen atom, then this can, if desired, be replaced by a halogen atom, that is to say, for example, by a chlorine, bromine or iodine atom. As halogenating agents, it is possible to use hypohalides, for example, NaOCl, NaOBr, NaOI, which can also be used in situ. Methods for the halogenation of acetyl compounds have been described by Bayer, Ber. 18, 2284 (1855), Strans, Ber. 63, 1868 (1930), Nef. Ann. 308, 326 (1899), and several others.

It is thus not necessary to deal with details of the halogenation.

The compounds of Formula I show a pronounced herbicidal, insecticidal and acaricidal action. They are however especially suitable for combating ectoparasites.

By ectoparasites there are to be understood those pests, in the widest sense, which attack useful animals but also wild animals and which are possible carriers of viruses and bacteria. A widely distributed group of the ectoparasites belongs to the order Acarina. Representatives of the order Acarina are, for example, Eulaelaps, Echinolaelaps, Laelaps, Haemogamasus, Dermanyssus, Ornithonyssus, Allodermanyssus, especially *Allodermanyssus sanguineus*, Pneumonyssus, Amblyomma, Aponomma, Boophilus, Dermacentor, Haemophysalis, Hyalomma, Ixodes, Margoropus, Rhipicephalus, Ornithodorus, Otobius, Cheyletidae, for example, Cheyletus, Psorergates, Demodicidae, Trombiculidae, for example, Trombicula, Eutrombicula, Schöngastia, Acomatacurus, Neoschöngastia, Euschöngastia, Sarcoptiformes, for example, Notoedres, Sarcoptes, Knemidokoptes, Psoroptidae, for example, Psoroptes, Chorioptes and Otodectes.

Amongst the above-mentioned pests it is also possible to include other insects which sting and which may transmit illnesses, such as for example *Aedes aegypti* and *Lucilia sericata*.

The present invention also provides a preparation for combating ectoparasites, which comprises, as active ingredient a compound of the general Formula I, together with a carrier and/or other additives.

The present invention also provides a method of combating ectoparasites, which comprises treating an animal with a preparation of the present invention.

It is advantageous to use within the range of from 0.5 to 95% of the active ingredient of Formula I. Suitable carriers and additives can be solid or liquid and correspond to the substances which are usual in formulation technology such as, for example, natural or regenerated mineral substances, solvents, diluents, dispersing agents, emulsifiers, wetting agents, adhesives, thickeners, binders or fertilisers. Furthermore, yet further biocidal compounds can be added. Such biocidal compounds can for example belong to the class of the ureas, the saturated or unsaturated halogen-fatty acids, halogenobenzonitriles, halogenobenzoic acids, phenoxyalkylcarboxylic acids, carbamates, triazines, nitroalkylphenols, organic phosphoric acid compounds, quaternary ammonium salts, sulphamic acids, arsenates, arsenites, borates or chlorates. Thus numerous use forms exist for the new active substances; these will be dealt with in more detail below:

In order to manufacture directly sprayable solutions of the compounds of general Formula I, it is, for example, possible to use mineral oil fractions of high to medium boiling range, for example, Diesel oil or kerosene, coal tar oils and oils of vegetable or animal origin, as well as hydrocarbons, for example, alkylated naphthalenes, tetrahydronaphthalene, xylenes, cyclohexanol, ketone, and also chlorinated hydrocarbons, for example, trichlorethane and tetrachlorethane, trichlorethylene or trichlorobenzenes and tetrachlorobenzene, individually or as a mixture thereof. Solvents of boiling point above 100° C. are advantageously used.

Aqueous application forms are especially appropriately prepared from emulsion concentrates, pastes or wettable spraying powders by adding water. Possible emulsifiers or dispersing agents are non-ionic products, for example condensation products of aliphatic alcohols, amines, or carboxylic acids having a long-chain hydrocarbon residue of about 10 to 20 carbon atoms, with ethylene oxide, for example, the condensation product of octadecyl alcohol and 25 to 30 mols of ethylene oxide, or that of soya fatty acid and 30 mols of ethylene oxide or that of technical oleylamine and 15 mols of ethylene oxide or that of dodecylmercaptan and 12 mols of ethylene oxide. As anionic emulsifiers which can be employed there may be mentioned: the sodium salt of dodecyl alcohol sulphuric acid ester, the sodium salt of dodecylbenzenesulphonic acid, the potassium or triethanolamine salt of oleic acid or of abietic acid or of mixtures of these acids, or the sodium salt of a petroleum-sulphonic acid. Possible cationic dispersing agents are quaternary ammonium compounds, for example, cetylpyridinium bromide or dihydroxyethylbenzyldodecylammonium chloride.

In order to manufacture dusting agents and scattering agents, it is possible to employ talc, kaolein, bentonite, calcium carbonate, calcium phosphate, but also charcoal, cork powder, wood flour and other materials of vegetable origin as solid carriers. It is also very appropriate to manufacture the preparations in a granular form. The various use forms can, in the usual manner, be provided with additions of substances which improve the distribution, adhesion, rain resistance or penetrating power; as such substances there may be mentioned: fatty acids, resins, glue, casein or alginates.

In the veterinary field the preparations according to the invention are applied in accordance with the usual processes, for example by the spraying, pouring, dusting and fumigating process. The so-called dipping process in which the animal is driven through a solution of the preparation or an emulsion of the preparation is also effective.

The preparations according to the invention can also be applied in a so-called spray line; here the animal is driven through a narrow passage which is provide at the sides, at the bottom and at the top with spray nozzles which wet the animal with the preparation from all sides.

The following examples illustrate the invention:

EXAMPLE 1

45.75 g. (0.15 M) of 2,4,5-tribromimidazole, 19.65 g. (0.165 M) of propargyl bromide, 22.80 g. (0.165 M) of potassium carbonate and 150 m. of dry acetone are stirred for 16 hours under reflux. After cooling to room temperature, the reaction mixture is filtered. The solid constituents are rinsed with acetone, and the filtrate is rendered slightly acid by means of glacial acetic acid (in the alkaline range there is a danger of explosion). Thereafter the solvent is evaporated in vacuo and at a bath temperature of 40° C. The residue of formula

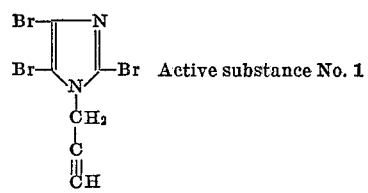

is twice recrystallised from alcohol.

Yield: 30.7 g. (61.5%).

Melting point: 119 to 119.5° C.

The following compounds are also manufactured in an analogous manner:

Active substance No. 1

| Active substance No. | | Melting point (° C.) |
|---|---|---|
| 2 | Br—⟨N⟩—Br, Br, N-CH₂-C≡C-CH₂OH | 132–133 |
| 3 | Br—⟨N⟩—Br, Br, N-CH₂-C≡C-Cl | 163–164 |
| 4 | Cl—⟨N⟩—Cl, Cl, N-CH₂-C≡C-H | 63–64 |

EXAMPLE 2

(a) Dusting agents

Equal parts of an active substance according to the invention and precipitated silica are finely ground. Dusting agents preferably containing 1 to 6% of active substance can be manufactured therefrom by mixing with kaolin or talc.

(b) Spraying powders

In order to manufacture a spraying powder, the following components are for example mixed and finely ground:

50 parts of active substance according to the present invention
20 parts of Hi-Sil (highly adsorbent silica)
25 parts of bolus alba (kaolin)
3.5 parts of a reaction product of p-tert. octylphenol and ethylene oxide, and
1.5 parts of sodium 1-benzyl-2-stearyl-benzimidazole-6,3'-disulphonate.

(c) Emulsion concentrate

Easily soluble active substances can also be formulated as an emulsion concentrate in accordance with the following instruction:

20 parts of active substance
70 parts of xylene, and
10 parts of a mixture of a reaction product of an alkylphenol with ethylene oxide and calcium dodecylbenzenesulphonate are mixed. A ready-to-use emulsion is produced on diluting with water to the desired concentration.

EXAMPLE 3

The active substances Nos. 1 to 4 according to the invention were tested for their action against *Rhipicephalus bursa*, *Boophilus microplus* sensitive to phosphoric acid esters and resistant to phosphoric acid esters, and *Dermanyssus gallinae*, in the following manner:

(A) *Rhipicephalus bursa*

5 adult hungry ticks or tick larvae were counted into glass tubes and dipped for 1 to 2 minutes in the 2 ml. of aqueous emulsion contained therein. These aqueous emulsions had an active substance content of 100, 50, 10, 1, 0.5 or 0.1 p.p.m. The tube was then closed with a cotton wool pad and turned in such a way that the active substance emulsion could be taken up by the cotton wool. The evaluation took place after 2 weeks. 2 repeats were carried out for each experiment. The compounds according to Example 1 achieved 100% mortality at the following p.p.m. values.

| Compound number | R. bursa, adult (p.p.m.) | R. bursa, larvae (p.p.m.) |
|---|---|---|
| 1 | 10 | 50 |
| 2 | 100 | 100 |
| 3 | 100 | 100 |
| 4 | 100 | 1 |

(B) *Boophilus microplus* (larvae)

Using the method described above, experiments with two repeats were carried out, in each case using about 10 to 20 *Boophilus microplus* larvae sensitive to phosphoric acid esters and resistant to phosphoric acid esters. (The resistance relates to the toleration of diazinone.)

100% mortality was found after 2 weeks at the following limiting concentrations in p.p.m.

| Compound number | B. microplus, larvae resistant (p.p.m.) | B. microplus, larvae sensitive (p.p.m.) |
|---|---|---|
| 1 | 10 | 5 |
| 2 | 100 | 100 |
| 3 | 50 | 10 |
| 4 | 1 | 0.5 |

(C) *Dermanyssus gallinae*

The test was carried out analogously to method A, but using 10 to 20 *Dermanyssus gallinae*. The evaluation took place after 72 hours.

The compounds according to Example 1 showed 100% mortality at the following p.p.m. values.

| Compound number | D. gallinae (p.p.m.) |
|---|---|
| 1 | 100 |
| 2 | 100 |
| 3 | 100 |
| 4 | 50 |

We claim:

1. A compound of the formula

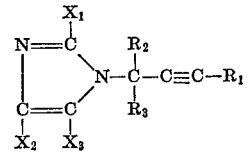

wherein $X_1$, $X_2$ and $X_3$ each represents halogen, $R_1$ represents hydrogen, halogen or alkyl of from 1 to 4 carbon atoms, and $R_2$ and $R_3$ each represents hydrogen or alkyl of from 1 to 4 carbon atoms.

2. A compound of the formula

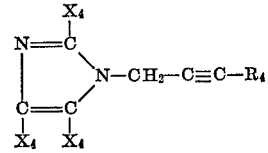

wherein $R_4$ represents hydrogen, iodine or alkyl of from 1 to 4 carbon atoms and $X_4$ represents chlorine or bromine.
3. The compound of formula
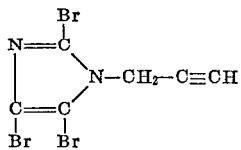
4. The compound of formula
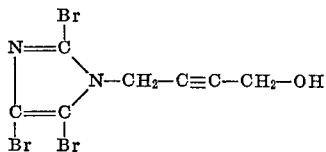
5. The compound of formula
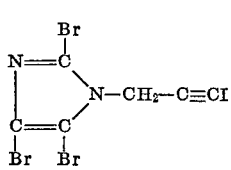
6. The compound of formula
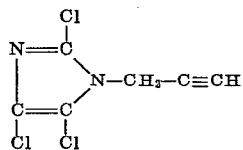
References Cited
UNITED STATES PATENTS
| | | | |
|---|---|---|---|
| 2,944,061 | 7/1960 | Jacob | 260—309 |
| 3,073,841 | 1/1963 | Schindler | 260—309 |
| 3,280,139 | 10/1966 | Klosa | 260—309 |
| 3,479,367 | 11/1969 | Miller | 260—309 |
| 3,435,050 | 3/1969 | Wasco | 260—309 |
| 3,255,201 | 6/1966 | Beaman et al. | 260—309 |
FOREIGN PATENTS
| | | | |
|---|---|---|---|
| 1,486,817 | 5/1967 | France | 260—309 |
| 1,088,895 | 10/1967 | Great Britain | 260—309 |
NATALIE TROUSOF, Primary Examiner
U.S. Cl. X.R.
424—273